H. W. SABIN.

Horse Hay-Rakes.

No. 5,244. Reissued Jan. 21, 1873.

Witnesses.
C. F. Brown.
Melville Schuch.

Calista E. Cox,
Executrix of
H. W. Sabin.
By Attys.
Hill & Ellsworth

AM. PHOTO-LITHOGRAPHIC CO. N.Y. (OSBORNE'S PROCESS)

UNITED STATES PATENT OFFICE.

CALISTA E. COX, OF WEST SOMERSET, NEW YORK, EXECUTRIX OF HARVEY W. SABIN, DECEASED.

IMPROVEMENT IN HORSE HAY-RAKES.

Specification forming part of Letters Patent No. 7,813, dated December 3, 1850; extended seven years, and again extended seven years by act of Congress from June 8, 1872; reissue No. 5,244, dated January 21, 1873.

DIVISION C.

*To all whom it may concern:*

Be it known that HARVEY W. SABIN, late of Canandaigua, in the county of Ontario and State of New York, now deceased, was the inventor of certain new and useful Improvements in Horse Hay-Rakes, for which Letters Patent of the United States were granted him for the term of fourteen years from the 3d day of December, 1850, and that the said patent was duly renewed and extended for the term of seven years from and after the expiration of the first term—to wit, from December 3, 1864—and was again extended by the Commissioner of Patents, by virtue of a special act of Congress, for the further term of seven years from and after the 8th day of June, A. D. 1872; and I, CALISTA E. COX, of West Somerset, in he county of Niagara and State of New York, xecutrix of the last will and testament of said HARVEY W. SABIN, deceased, and sole owner of the extended term of said Letters Patent, do hereby declare the following to be a full, clear, and exact description of the construction of that part of the invention for applying pressure to rake-teeth, reference being had to the accompanying drawing and letters of reference marked thereon forming a part of this specification, in which—

Figure 1:
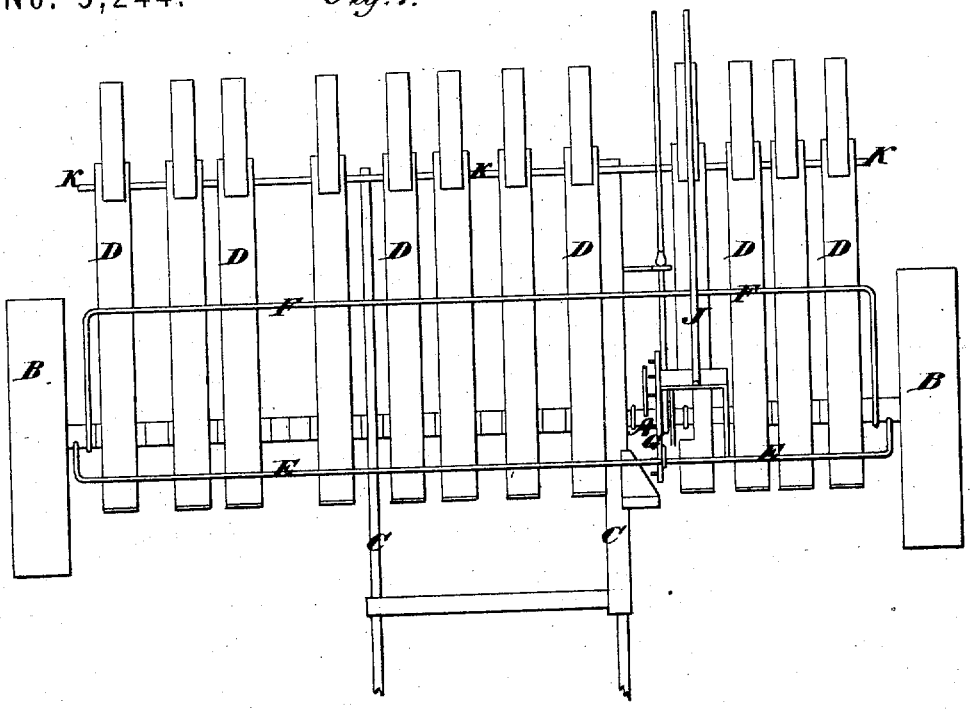
Figure 2:
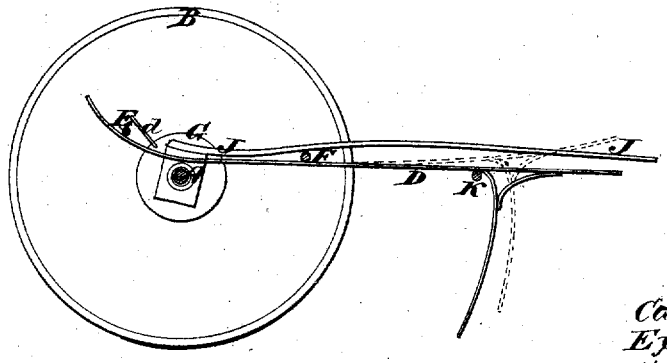

Figure 1 is a plan view of a rake, showing the improvement herein claimed applied to it. Fig. 2 is a vertical longitudinal section of the same.

Similar letters of reference in the two figures refer to corresponding parts.

The nature of the invention covered by this patent consists, first, in rake-teeth which are springs in themselves, as will be hereinafter described, in connection with pressure applied, at the will of the operator, to them at a point in rear of that where they are hung, so that while pressure is exerted upon the teeth they have a chance to yield or spring between the point of applying the pressure and their gathering extremities, and thus, while the teeth are held down to their work, they singly or collectively may spring up over obstructions and again resume their proper raking position without injury to themselves, as the great length of their springing capacity—to wit, from the point of pressure to their raking ends—admits of a considerable elevation of their gathering-points without danger of breakage from undue strain upon them; second, it consists in rake-teeth which are springs in themselves, as will be hereinafter described, and constructed and arranged so as to articulate independently or collectively on their axial support, in combination with pressure applied to them, at the will of the operator, at a point which is in rear of their point of articulation.

To enable others skilled in the art to make and use this invention, I will proceed to describe, in connection with the drawing, one practical way in which the same may be done.

In the accompanying drawing, A is a supporting-axle; B B, two transporting-wheels, one of which is made fast upon the axle so as to rotate with it; C C, shafts or thills; D D, rake-teeth, articulating on the axle; E, a tilting frame for elevating the teeth; and F, an oscillating frame for pressing down the teeth. Both these frames articulate independently of each other on the axle A. J is a hand-lever fastened to a hub of a disk, G, which articulates on the axle A. This lever extends back over the oscillating pressure-frame F, and with it the operator may exert the requisite pressure upon the said pressure-frame to keep the rake-teeth down to their work. The disk G, above mentioned, has a pin, *d*, near its circumference, which, when the hand-lever J is raised by the operator, depresses the tilting frame E, and causes it to press against the forward ends of all the teeth, and thereby elevate their raking ends. When the lever is released the parts all assume their original position on account of the superior weight of the rear portion of the rake. K is a bar arranged on the rear extensions of the thills in rear of the axle, and serving as a support for all the rake-teeth, and also as a "clearer" to the same as they rise to discharge their gathered load of hay.

The rake-teeth D are made of springy metal from their gathering extremities to their axis of motion in order that they shall possess a yielding capacity between their articulating points and their gathering extremities, or from the point where the pressure-frame F rests upon them to their ends which touch the ground.

In the drawing, Fig. 2, we have shown a rake-tooth in two conditions while subjected to the downward pressure of the frame F. The condition shown by black lines is the one remains in when not obstructed by anything more than the light yielding hay which is being gathered; and the condition shown by dotted lines is the one it is caused to assume when a more formidable or unyielding obstacle comes in its path. From inspection of this figure of the drawing it will be seen that the teeth have a yielding capacity from their gathering-point to the point where the pressure is applied, and, therefore, they are capable of springing up and back to a sufficient extent for passing over any common obstruction in hay fields without requiring the pressure upon them to be removed.

It is very important to have pressure applied to each of the rake-teeth in rear of their supporting-axis, in order to keep the whole series down to their work; but in using such pressure upon teeth, it is either necessary to have the operator constantly on the lookout for obstructions which are liable to break the teeth, so that at the proper moment he may elevate them to clear such obstructions, or make provision in the teeth themselves for passing over the same. This provision in the teeth themselves, in connection with a pressure device which is applied at the will of the operator, as above described, is the feature of the invention herein claimed, the same being an improvement over the plans heretofore devised wherein the teeth themselves are not made with a yielding capacity from the point of applying pressure to their gathering ends; or, in other words, where rake-teeth are attached to rigid stocks, and springs are applied on top of said stocks and under a pressure-bar, or where the pressure which keeps the teeth down is constantly applied, and not under the control of the operator, as is the case when auxiliary springs are connected to the teeth for the purpose of keeping them to their work.

The rake-teeth have each an independent articulation on their support by means of eye-bearings, which move with them on their support. By this arrangement any one of the teeth may be allowed to rise independently of the others when a stump or other dangerous obstacle comes in its path, the pressure-frame of course being allowed to rise when such rising of a single tooth occurs. When a tooth or two or more teeth thus rise, the other teeth may remain down to their work. The advantages of having independent articulation and collective articulation in the teeth while not under pressure, in connection with springing capacity while under pressure, are thus secured.

Having described one practical mechanical contrivance for carrying out the invention herein set forth, what I claim as new, and desire to secure by Letters Patent, is—

1. The application of pressure, at the will of the operator, to metallic spring rake-teeth, which are so constructed as to have a spring action within themselves from their gathering ends to the point (or forward thereof) where the pressure is applied to hold them down to their work, by means substantially as herein described.

2. The combination of independently-articulating rake-teeth which are springs within themselves and a pressure contrivance which is under the control of the operator, substantially as and for the purposes herein described.

CALISTA E. COX, *Executrix.*

Witnesses:
REUBEN TENNY,
JOHN R. JESSON.